(12) United States Patent
Wohlers et al.

(10) Patent No.: US 11,458,421 B2
(45) Date of Patent: Oct. 4, 2022

(54) FILTER APPARATUS

(71) Applicant: HYDAC FLUIDCARECENTER GMBH, Sulzbach/Saar (DE)

(72) Inventors: Alexander Wohlers, Saarburg (DE); John Otto, Spicheren (FR); Werner Wilkendorf, Ottweiler (DE)

(73) Assignee: HYDAC FLUIDCARECENTER GMBH, Sulzbach/Saar (DE)

( * ) Notice: Subject to any disclaimer, the term of this patent is extended or adjusted under 35 U.S.C. 154(b) by 713 days.

(21) Appl. No.: 16/470,279

(22) PCT Filed: Jan. 9, 2018

(86) PCT No.: PCT/EP2018/050419
§ 371 (c)(1),
(2) Date: Jun. 17, 2019

(87) PCT Pub. No.: WO2018/137919
PCT Pub. Date: Aug. 2, 2018

(65) Prior Publication Data
US 2021/0283531 A1    Sep. 16, 2021

(30) Foreign Application Priority Data

Jan. 26, 2017 (DE) ..................... 10 2017 000 713.6

(51) Int. Cl.
| | |
|---|---|
| *B01D 19/00* | (2006.01) |
| *B01D 36/00* | (2006.01) |
| *B01D 35/147* | (2006.01) |
| *B01D 29/15* | (2006.01) |
| *B01D 29/92* | (2006.01) |

(52) U.S. Cl.
CPC ..... *B01D 19/0031* (2013.01); *B01D 19/0036* (2013.01); *B01D 19/0063* (2013.01); *B01D 29/15* (2013.01); *B01D 29/92* (2013.01); *B01D 35/1475* (2013.01); *B01D 36/001* (2013.01)

(58) Field of Classification Search
CPC ............ B01D 19/0031; B01D 19/0036; B01D 19/0063; B01D 29/15; B01D 29/92; B01D 35/1475; B01D 36/001; B01D 29/925
USPC .... 210/120, 136, 117, 130, 188, 218, 416.1, 210/406, 436, 472; 95/46
See application file for complete search history.

(56) References Cited

U.S. PATENT DOCUMENTS

| | | | |
|---|---|---|---|
| 4,251,240 A * | 2/1981 | Brennan | ................. F04D 9/003 96/197 |
| 2012/0018358 A1 | 1/2012 | Sann et al. | |
| 2016/0008740 A1 | 1/2016 | Jensen et al. | |

FOREIGN PATENT DOCUMENTS

| | | |
|---|---|---|
| DE | 31 08 948 | 11/1982 |
| DE | 195 11 482 | 10/1996 |
| DE | 696 34 413 | 3/2006 |

(Continued)

OTHER PUBLICATIONS

International SearchReport (ISR) dated Mar. 2, 2018 in International (PCT) Application No. PCT/EP2018/050419.

*Primary Examiner* — Madeline Gonzalez
(74) *Attorney, Agent, or Firm* — Wenderoth, Lind & Ponack, L.L.P.

(57) ABSTRACT

A filter apparatus, in particular for the filtration of hydraulic media, includes a filter housing (4) and a filter element (30) arranged in the filter housing, Air present in the filter housing (4) can be removed from the housing by suction by a degassing device (52) that generates a negative pressure.

11 Claims, 7 Drawing Sheets

(56) References Cited

FOREIGN PATENT DOCUMENTS

| | | |
|---|---|---|
| DE | 10 2012 000 221 | 7/2013 |
| EP | 0 856 345 | 8/1998 |
| WO | 2010/118803 | 10/2010 |
| WO | 2014/131420 | 9/2014 |

* cited by examiner

FILTER APPARATUS

FIELD OF THE INVENTION

The invention relates to a filter device, in particular for the filtration of hydraulic media, having a filter housing and a filter element arranged therein.

BACKGROUND OF THE INVENTION

Filter devices of the above type being part of hydraulic systems are state of the art. To avoid impairments of safety-relevant components, such as valves, hydraulic drives, control elements and the like, an important prerequisite is the filter devices providing a consistent quality of the filtered media. The proper functioning of the filter devices in the system is therefore a basic condition for operational safety.

SUMMARY OF THE INVENTION

In view of this, the invention addresses the problem of providing a filter device that meets the operational requirements particularly well.

According to the invention, this object is basically achieved by a filter device having f a degassing device, which generates a negative pressure. Suction is used to remove air located in the filter housing. In this way, the risk of the stiffness of hydraulic drives or actuating devices or the functionality of valves being impaired by air entrained in the fluid is eliminated. The separation of air from fluids in general is state of the art, cf. for instance DE 10 2012 000 221 A1. The method shown there for the separation of gas from a medium stored in a reservoir by generating a differential pressure between the reservoir and another reservoir is not applicable to filter devices. In contrast, the invention provides for the removal of air by direct suction from the filter housing by a degassing device.

In preferred embodiments, the degassing device has a jet pump, which can be actuated by a media flow generated in particular by a hydraulic pump, such as a gear pump. The jet pump can be actuated by an external media flow or advantageously by a media flow formed from the filtrate of the device.

In particularly advantageous embodiments, the degassing device has a valve device, in particular in the manner of a slide valve, which routes air from the filter housing into a vacuum chamber and closes the pertinent flow path of an inflowing hydraulic medium. Such a valve device is preferably media controlled, i.e. it reacts to the viscosity difference between air and hydraulic fluid.

Advantageously, the degassing device may have a removal device, which acts as an aperture or throttle. In addition or as an alternative to the valve device, the aperture or throttle allows air or oil to flow from the filter housing into the vacuum chamber. As a result, an extraction from two different regions of the filter housing can be formed.

The vacuum chamber may be permanently connected on the input side to the valve device and/or the removal device and on the output side may also be permanently connected to the jet pump.

In advantageous embodiments, the output side of the jet pump, preferably with the interposition of a check valve, is connected to a guide that guides the fluid flow of the jet pump above the fluid level of a fluid container, in which the filter housing is disposed, along the container wall forming a fluid film. In a filter device, in which the filter housing is arranged in a tank, in which a fluid volume is stored, a particularly effective separation of air from the fluid film in contact with the wall of the tank can be achieved by such introduction of the oil/air mixture from the jet pump at the side of the tank. At the same time, the check valve prevents any possible ventilation of the filter housing from the space above the fluid level of the tank.

In particularly advantageous embodiments, the filter housing is suitable for receiving filter elements, through which the fluid to be cleaned can pass from the outside to the inside or from the inside to the outside. In the first alternative, a channel guide is provided for in the upper end cap of the filter element, which guide channel is routed from the highest point of the fluid container to the vacuum chamber. In the second alternative, channels are provided at the end cap, which channels are routed from the inflow side of the filter element to the vacuum chamber. As a result, one single filter device design can be operated using different filter elements. The degassing device is effective in both cases.

In this case, the arrangement can advantageously be made such that the channel guide leads to a control chamber of the valve device and the channels of the end cap are connected to the vacuum chamber, preferably via the aperture or throttle serving as removal device.

With particular advantage, a pressure sensor or pressure switch may be connected to the vacuum chamber, each for monitoring the vacuum degassing. The status of the degassing device can be monitored via a connection to the relevant machine control.

The vacuum chamber and/or the valve device may be part of a head part of the filter housing sealing the fluid container towards the outside. In that way the filter device forms a uniform, compact structure, including the degassing.

Other objects, advantages and salient features of the present invention will become apparent from the following detailed description, which, taken in conjunction with the annexed drawings, discloses a preferred embodiment of the present invention.

BRIEF DESCRIPTION OF THE DRAWINGS

Referring to the drawings that form a part of this disclosure.

DETAILED DESCRIPTION OF THE INVENTION

Figure 1:
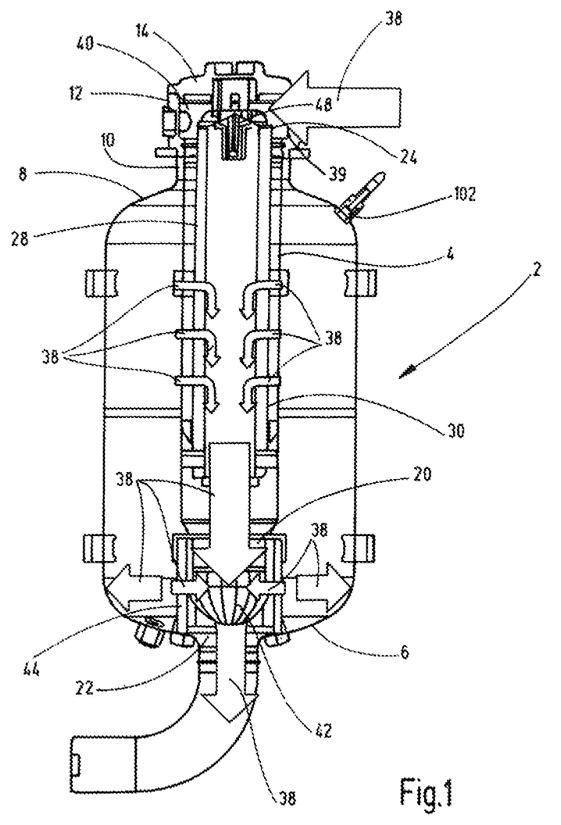
FIG. 1 is a schematically simplified side view in section of a filter device according to an exemplary embodiment of the invention.
Figure 4:
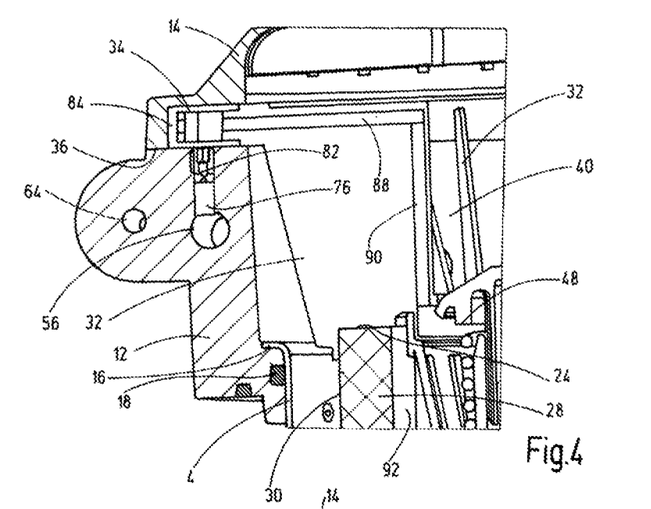
FIG. 4 is a partial side view in section of a lateral longitudinal section of the exemplary embodiment in the area of the head part of the housing.
Figure 5:
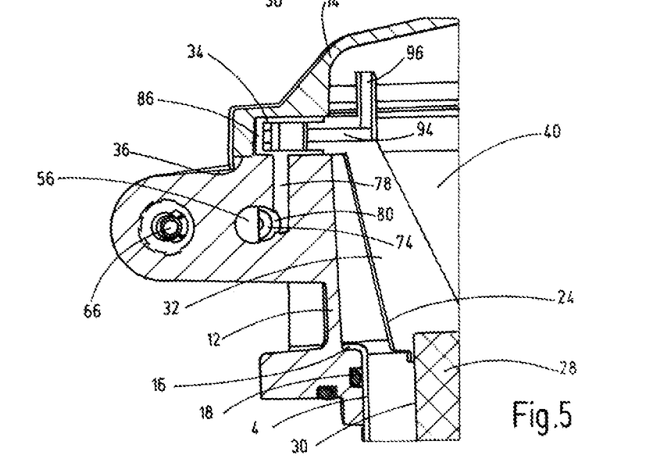
FIG. 5 is a partial side view in section, the sectional plane of which is rotated by 30° with respect to FIG. 4.

Below, the invention is described with reference to an exemplary embodiment, in which the filter device is part of a semi-closed hydraulic system having a tank system. FIG. 1 shows the exemplary embodiment having a filter housing 4 built into in a small-volume tank 2 holding a fluid volume. The circular cylindrical tank 2 has a curved, lower bottom part 6 and a correspondingly curved upper part 8, which merges into a container neck part 10 coaxial to the vertical container axis 30. This upper part 8 is followed by a head part 12 of the housing sealing the tank 2 at the upper end, the upper termination being formed by a cover lid 14 bolted to the head part 12. A flared lap 16 of the upper open end of the filter housing 4, which extends coaxially into the tank 2, is held at the head part 12 of the housing and sealed thereto by a sealing ring 18 (FIGS. 4-5). The lower end of the filter housing 4 is followed by an output chamber 20, which forms the fluid connection to a fluid outlet 22 at the bottom part 6 of the tank 2. The output chamber 20 34 has an axial height, which corresponds to about one fifth of the height of the tank 2.

Figure 9:
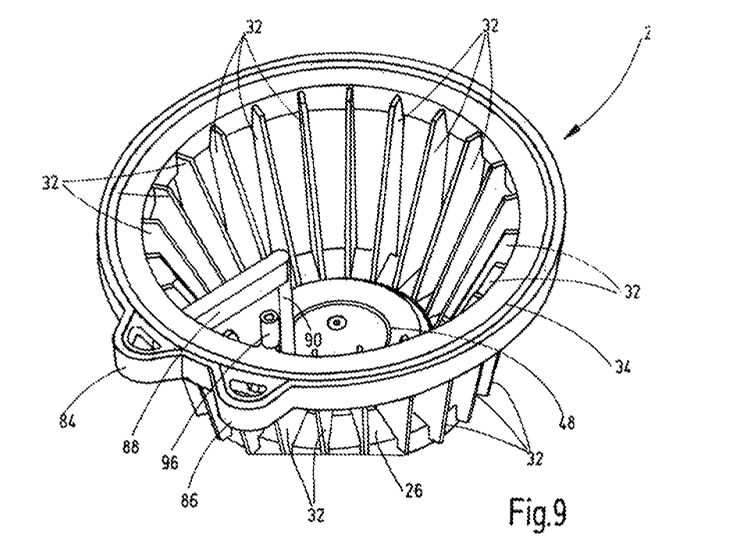
FIG. 9 shows a perspective oblique view of the upper end cap of the filter element of the exemplary embodiment.

FIG. 9 shows the upper end cap 24 in a separate representation, which end cap forms a surround 26 (FIG. 9) for the upper end of the filter medium 28 (FIG. 4 and FIG. 5) of the filter element 4 received in the filter housing 30 and a seat for a bypass valve 48. The integrally molded plastic material end cap 24 has, starting from the enclosure 26, a ring of wing-shaped ribs 32 (not all numbered), which expand the end cap 24 in the form of a basket upwards and which extend into an upper ring body 34. Upper ring body is clamped between the top 36 of the head part 12 and the lid 14, when filter element 30 is built into the tank 2, cf. FIGS. 4 and 5.

Figure 2:
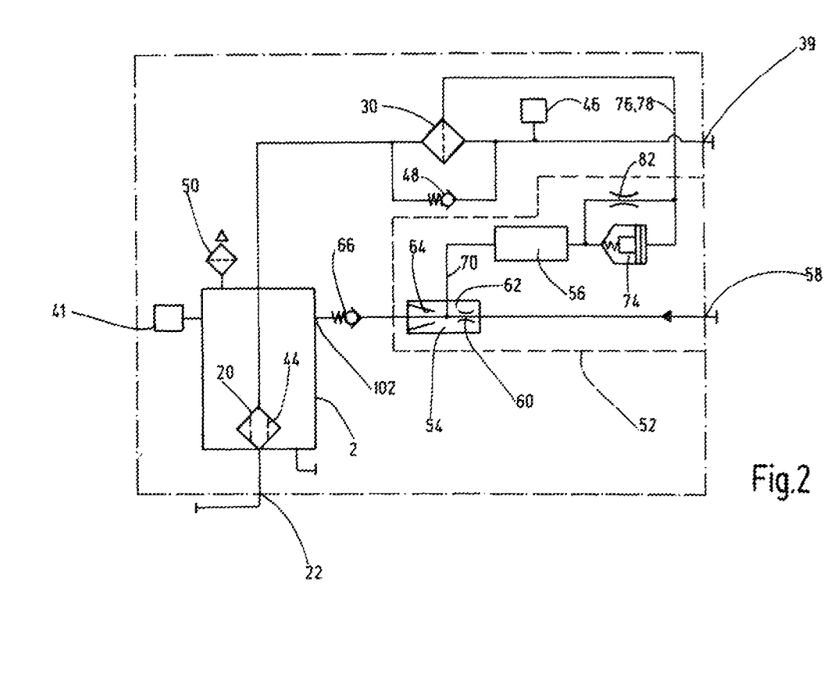
FIG. 2 is a schematic hydraulic circuit diagram of the exemplary embodiment.

FIG. 2 shows a symbolic representation of the hydraulic circuit of the filter device. FIG. 1 uses flow arrows 38 to illustrate the operation of the filter device, in which unfiltered material passes into the interior 40 in the head part 12 through an inlet 39 located at the head part 12. From inlet 39, the unfiltered material flows into the space between the filter housing 4 and the outside of the filter material 28 of the filter element 30 and flows through the filter medium 28 from the outside to the inside. The filtrate formed flows into the outlet chamber 20, in which a screen basket 42 is located between the chamber inlet and the fluid outlet 22, from which the filtrate can be discharged. The outer wall of the output chamber 20 is formed by a screen cylinder 44, through which the filtrate also reaches the interior of the tank 2. In operation, the flow rate at the outlet 22 is adjusted such that a desired liquid level is reached in the interior of the tank 2 due to the amount of unfiltered material flowing into the head part 12. An opto-electrical level switch 41 may be provided on the tank 2 (FIG. 2) for the relevant machine control.

Figure 6:
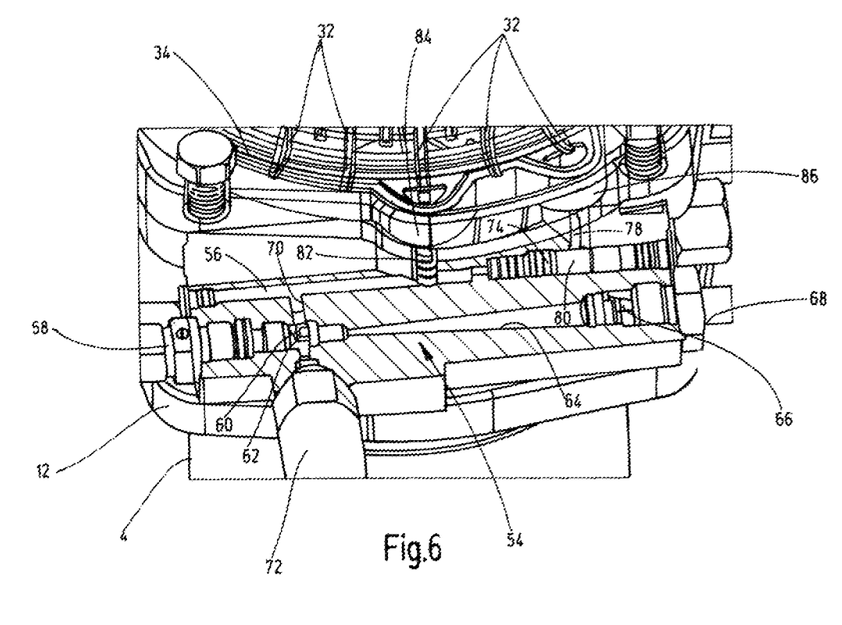
FIG. 6 is a partial perspective view in section of the area of the head part of the housing of the exemplary embodiment having a degassing device.
Figure 7:
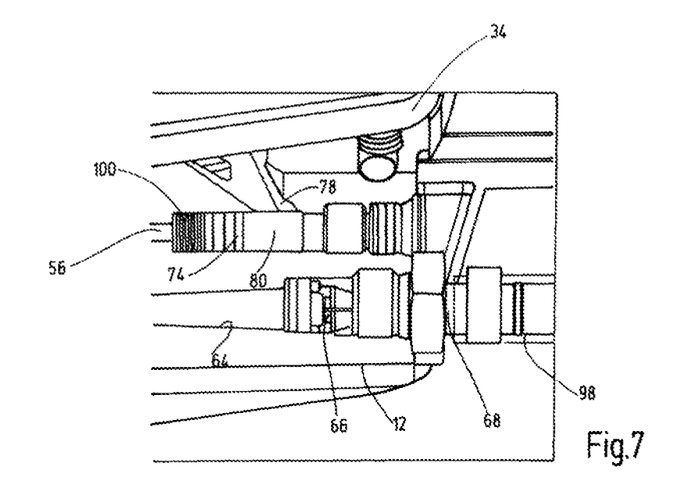
FIG. 7 is a partial plan view of the area of the degassing device of FIG. 6 having a valve device, the valve device being shown closed.

As shown in FIG. 2, the filter element 30, a clogging indicator 46 and the bypass valve 48 are assigned in the manner typical for filter devices. The tank 2 has a tank ventilation 50 towards the outer environment also formed in a usual manner. In operation, the opto-electrical level switch 41, which is part of the machine control, permits the observance of the desired fluid level in the tank 2 by controlling the discharge rate of the filtered medium at the outlet 22. In the circuit of FIG. 2, a degassing means or degasser 52 is connected to the filter element 30, the structure of which degasser is shown in more detail in FIG. 3. In the horizontal section of the head part 12 of FIG. 3 as well as in the horizontally cut regions of FIGS. 6 to 8, the sectional plane passes through the cavities of the degassing device 52 such that their main components, such as jet pump 54 and vacuum chamber 56, are exposed and visible. For the supply of a media flow actuating the jet pump 54, the jet pump has a pressure connection 58, through which a media flow, in the present example filtrate from the filter device, is supplied to a jet nozzle 60 in a mixing chamber 62 of the jet pump 54 via a pump (not shown), such as a gear pump, at a pressure of 25 bar to 40 bar and at a flow rate of 3.5 l/min. In the manner typical for jet pumps, a diffuser 64 adjoins the mixing chamber 62, at the end of which diffuser a non-return valve 66 is arranged upstream of an outlet port 68, from which the media flow operating the pump 54 exits at a pressure of 1 bar.

Figure 3:
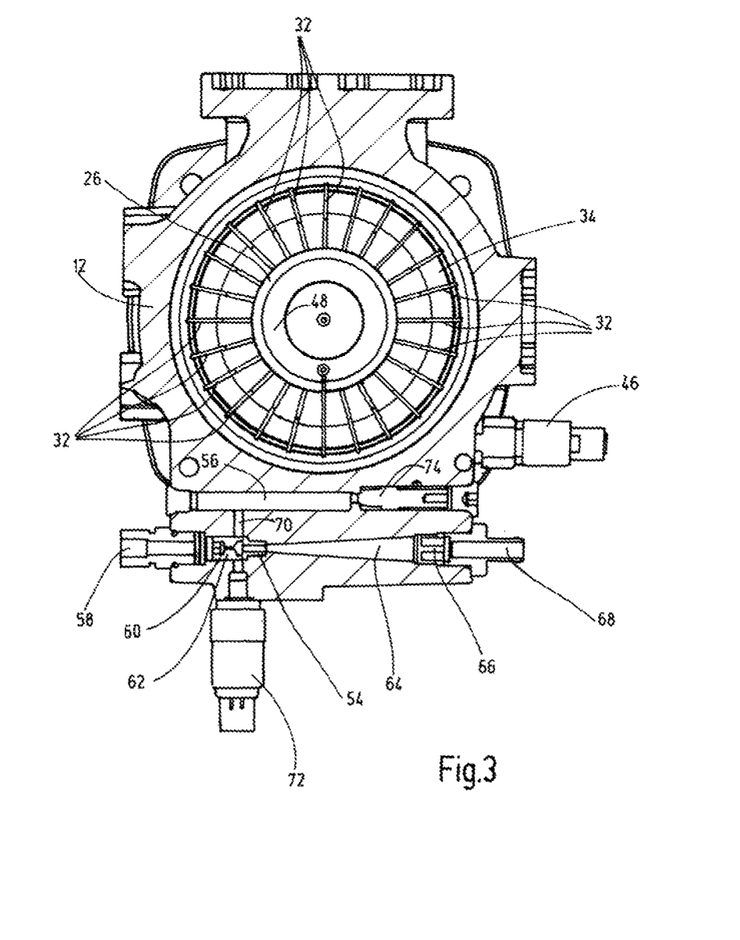
FIG. 3 is a plan view in section, where the sectional plane is located in a head part of the housing, of the exemplary embodiment.

The vacuum chamber 56 is connected to the mixing chamber 62 via a channel 70, to which mixing chamber a pressure switch sensor 72 is also connected. Pressure switch sensor 72 is connected to the machine control for operation monitoring control purposes. A valve adjoins the end of the vacuum chamber 56 adjacent to the diffuser 64 of the jet pump 54. In the present example the valve is a slide valve 74.

As shown in FIGS. 4 and 5, fluid channels 76 and 78 extend from the vacuum chamber 56 to the top 36 of the head part 12. Channel 78 opens into a control chamber 80 of the spool valve 74. The other channel 76 opens into the vacuum chamber 56 via a throttle 82 at a point offset relative to the slide valve 74.

As shown in FIGS. 4 and 5 in conjunction with FIG. 9, the ends of the channels 76 and 78 exposed at the top 36 of the head part 12 continue as radially projecting lugs 84 and 86 of the annular body 34 of the end cap 24. For continuing the channel 76, FIG. 4 shows channels 88 and 90, which are formed in the end cap 24 and routed to the inner filter cavity 92 of the filter element 30, which forms the inflow side when the filter medium 28 flows through from the inside to the outside. For the continuation of the channel 78, FIG. 5 shows a channel 94, which is routed to the highest point of the housing located inside the lid 14 via a vertical suction tube 96.

Figure 8:
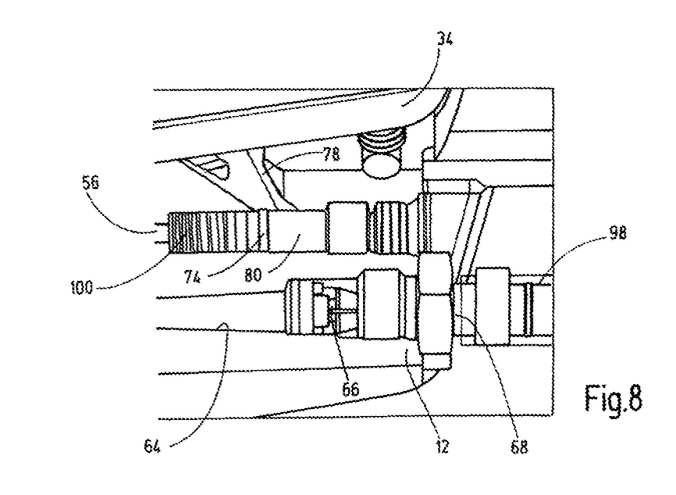
FIG. 8 is a partial plan view of the area of the degassing device of FIG. 6, the valve device being in the opened state.
Figure 10:
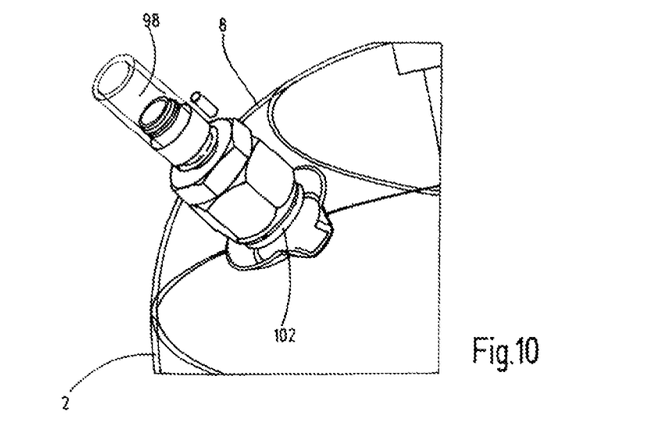
FIG. 10 is a partial perspective view located below the head part of the housing of the fluid container of the exemplary embodiment having a guide device for introducing a fluid flow into the container.

The spool valve 74 is pre-stressed into the open position shown by a compression spring 100 as shown in FIG. 8, in which the channel 78 is connected to the vacuum chamber 56. When air is sucked into the control chamber 80 in operation, due to the compressibility of air, the spring 100 holds the spool valve 74 open against the suction pressure of the vacuum chamber 56 in the open state, cf. FIG. 8. When liquid is sucked in, and thus, there is a lack of compressibility of the pressure pad in the control chamber 80, the slide valve 74 closes, cf. FIG. 7. In this arrangement, in operation a liquid/air mixture is sucked into the vacuum chamber 56 from the highest point of the housing via the throttle 82 in the channel 76, and air is sucked from the inflow side of the filter element 30 via the slide valve 74 and the channel 78. The jet pump 54 sucks these media from the vacuum chamber 56 into the mixing chamber 62 via the channel 70, from which mixing chamber they are ejected from the diffuser 64 of the jet pump 54 via the check valve 66 at port the 68 together with the media flow operating the jet pump 54. The port is connected to a flow guide device 102 via a flexible line 98 (FIG. 10). The guide device is arranged on the wall of the curved top part of the tank 8 and continues inside the tank into a discharge pipe a not visible in FIG. 10, from which the air-liquid mixture suctioned by the degassing device 52 is routed along the inside of the tank wall tangentially in the circumferential direction. A fluid film then forms on the tank wall. In that way, air is particularly effectively separated from the media mixture. The non-return valve 66 located upstream of the discharge connection at the diffuser 64 of the jet pump 54 prevents a possible backflow when the system is at a standstill and, if appropriate, the opening of the guide device 102 if the filling level of the tank 2 is exceeded.

While one embodiment has been chosen to illustrate the invention, it will be understood by those skilled in the art that various changes and modifications can be made therein without departing from the scope of the invention as defined in the appended claims.

What is claimed is:

1. A filter device for filtration of hydraulic media, the filter device comprising:
   a filter housing;
   a filter element being in the filter housing, having an inner filter cavity and being capable of a filtering flow from an outside to an inside of the filter element or from the inside to the outside of the filter element;
   a degasser being connected to the filter housing and generating a negative pressure removing air from the filter housing by suction, the degasser having a vacuum chamber, a jet pump and a valve moving air from the filter housing to the vacuum chamber and closing a flow path to any hydraulic medium flowing from the filter housing to the vacuum chamber;
   a removal device of the degasser acting as an orifice or throttle letting air or oil to flow from the filter housing into the vacuum chamber in addition to or alternatively to the valve;
   permanent connections of an input side of the vacuum chamber to the valve and of an output side of the removal device to the jet pump;
   a channel guide being in an upper end cap of the filter element and being routed from a highest point of a fluid container in which the filter housing is located to the vacuum chamber when the filtering flow is from the outside to the inside of the filter element; and
   channels in the end cap extending from an inflow side of the filter element to the vacuum chamber, a channel guide being routed to a control chamber of the valve, and the channels in the end cap being connected to the vacuum chamber when the filtering flow is from the inside to the outside of the filter element.

2. The filter device according to claim 1 wherein the valve is a slide valve.

3. The filter device according to claim 1 wherein the channels are connected to the removal device via the orifice or throttle.

4. The filter device according to claim 1 wherein the jet pump is actuatable by a media flow.

5. The filter device according to claim 4 wherein the media flow is generated by a hydraulic pump.

6. The filter device according to claim 5 wherein the hydraulic pump is a gear pump.

7. The filter device according to claim 1 wherein an output side of the jet pump is connected to a guide conveying the fluid flow of the jet pump above a fluid level in the fluid container along a container wall of the fluid container forming a fluid film on the container wall.

8. The filter device according to claim 7 wherein the output side of the jet pump is connected to the guide via a check valve.

9. The filter device according to claim 1 wherein a pressure sensor or pressure switch is connected to the vacuum chamber, the pressure sensor or pressure switch monitoring a vacuum of the degasser.

10. The filter device according to claim 1 wherein the vacuum chamber and the valve are part of a head part of the filter housing sealing the fluid container against the outside.

11. The filter device according to claim 1 wherein the filter element is tubular.

* * * * *